(12) United States Patent
Takemura

(10) Patent No.: US 6,238,082 B1
(45) Date of Patent: May 29, 2001

(54) PROCESS FOR PRODUCING AQUEOUS DISPERSION OF A POLYMER SUBSTANCE

(76) Inventor: Akira Takemura, 1-106, Irie, Kanazawa-shi, Ishikawa 921-8011 (JP)

( * ) Notice: Subject to any disclaimer, the term of this patent is extended or adjusted under 35 U.S.C. 154(b) by 0 days.

(21) Appl. No.: 09/417,241

(22) Filed: Oct. 12, 1999

(30) Foreign Application Priority Data

Oct. 16, 1998 (JP) .................................................. 10-295674

(51) Int. Cl.$^7$ .................................................. B01F 3/00
(52) U.S. Cl. .................................................. 366/348; 366/304
(58) Field of Search .................................. 366/304, 315, 366/317, 349, 348

(56) References Cited

U.S. PATENT DOCUMENTS

| | | | |
|---|---|---|---|
| 4,263,193 | * | 4/1981 | Sakimoto et al. . |
| 4,361,414 | * | 11/1982 | Nemes et al. ........................ 366/304 |
| 4,610,548 | * | 9/1986 | Hallet et al. ........................ 366/304 |
| 4,748,219 | * | 5/1988 | Gordini ................................ 366/304 |
| 4,915,509 | * | 4/1990 | Sauer et al. ........................ 366/304 |
| 4,917,546 | * | 4/1990 | Bulicz ................................ 366/304 |
| 5,622,650 | * | 4/1997 | Rourke ................................ 366/304 |
| 5,869,567 | * | 2/1999 | Fujita et al. . |

FOREIGN PATENT DOCUMENTS

| | | | |
|---|---|---|---|
| 51-111848 | * | 10/1976 | (JP) . |
| 52-33982 | * | 3/1977 | (JP) . |
| 7-304876 | * | 11/1995 | (JP) . |

* cited by examiner

*Primary Examiner*—Tony G. Soohoo
(74) *Attorney, Agent, or Firm*—Carter, Ledyard & Milburn

(57) ABSTRACT

The present invention provides a process for producing an aqueous dispersion of a polymer substance, wherein a mill is used as a mixing apparatus, the mill comprises a disk-type rotor serving as a rotational body and a stator serving as a non-rotational body, the rotor and the stator are disposed oppositely, a protrusion is formed on at least one of the opposed surfaces of the rotor and the stator, the rotor and the stator are disposed such that the distance therebetween becomes narrower, a polymer substance serving as a raw material which is melted in advance so as to assume a liquid state and an aqueous poval solution are fed to the narrow space in the mill, and the rotor is rotated at high speed, to thereby produce an aqueous dispersion. The process may provide downsized producing equipment while saving space and reducing equipment cost.

22 Claims, 1 Drawing Sheet

PROCESS FOR PRODUCING AQUEOUS DISPERSION OF A POLYMER SUBSTANCE

BACKGROUND OF THE INVENTION

1. Field of the Invention

The present invention relates to a process for producing an aqueous dispersion of a polymer substance, and more particularly to a process for producing an aqueous dispersion of a polymer substance, which process enables production of the dispersion in a large amount within a short time, the dispersion having the following characteristics: a narrow distribution of particle size and concentration of the substance; ability to form a protective colloid in a consistent manner; and a variety of applications including imparting water-repellence, anticorrosiveness, and adhesiveness.

2. Background Art

A conventionally known process for producing an aqueous dispersion composition is disclosed in Japanese Patent Application Laid-Open (kokai) No. 304876/1995. In this process, a raw material and a dispersant are placed in a pre-heated kneading apparatus, and the raw material and the dispersant are kneaded by application of shearing force and heated to 160° C. (the softening point of the raw material) or more. Subsequently, after softening and mixing of the raw material is completed, water is added to the resultant mixture, to thereby produce an aqueous dispersion having a predetermined concentration. In this process, asphalt is used as a raw material and partially-saponified poval is used as a dispersant, and poval is allowed to stand six hours or more in advance and is swollen with water to assume the form of sponge block.

However, in the above-described process, raw materials which may be used are limited to substances having a softening point of 160° C. or less. Use of a substance having a softening point of 160° C. or more as a raw material requires a sophisticated kneading apparatus which can effect heating and pressurizing simultaneously, and such an apparatus may contribute to high equipment cost.

Meanwhile, six hours or more are required for swelling partially-saponified poval with water into the form of sponge block, to thereby disadvantageously require a long time for producing a dispersion. In addition, completion of an aqueous dispersion requires about 60 minutes after a raw material is placed into a kneading apparatus, and producing the dispersion in a short time is fundamentally difficult.

SUMMARY OF THE INVENTION

In view of the foregoing, an object of the present invention is to provide a process for producing an aqueous dispersion of a polymer substance, which may provide downsized production equipment so as to save space, and reduce equipment cost.

Another object of the present invention is to provide a process for producing an aqueous dispersion of a polymer substance capable of producing the dispersion in a great amount in a short time, wherein the dispersion provides low variance in particle size and concentration of the substance and the dispersion has stability in forming a protective colloid.

BRIEF DESCRIPTION OF THE DRAWING

Various other objects, features, and many of the attendant advantages of the present invention will be readily appreciated as the same becomes better understood with reference to the following detailed description of the preferred embodiments when considered in connection with an accompanying drawing, in which.

DESCRIPTION OF THE INVENTION AND PREFERRED EMBODIMENTS

Figure 1:
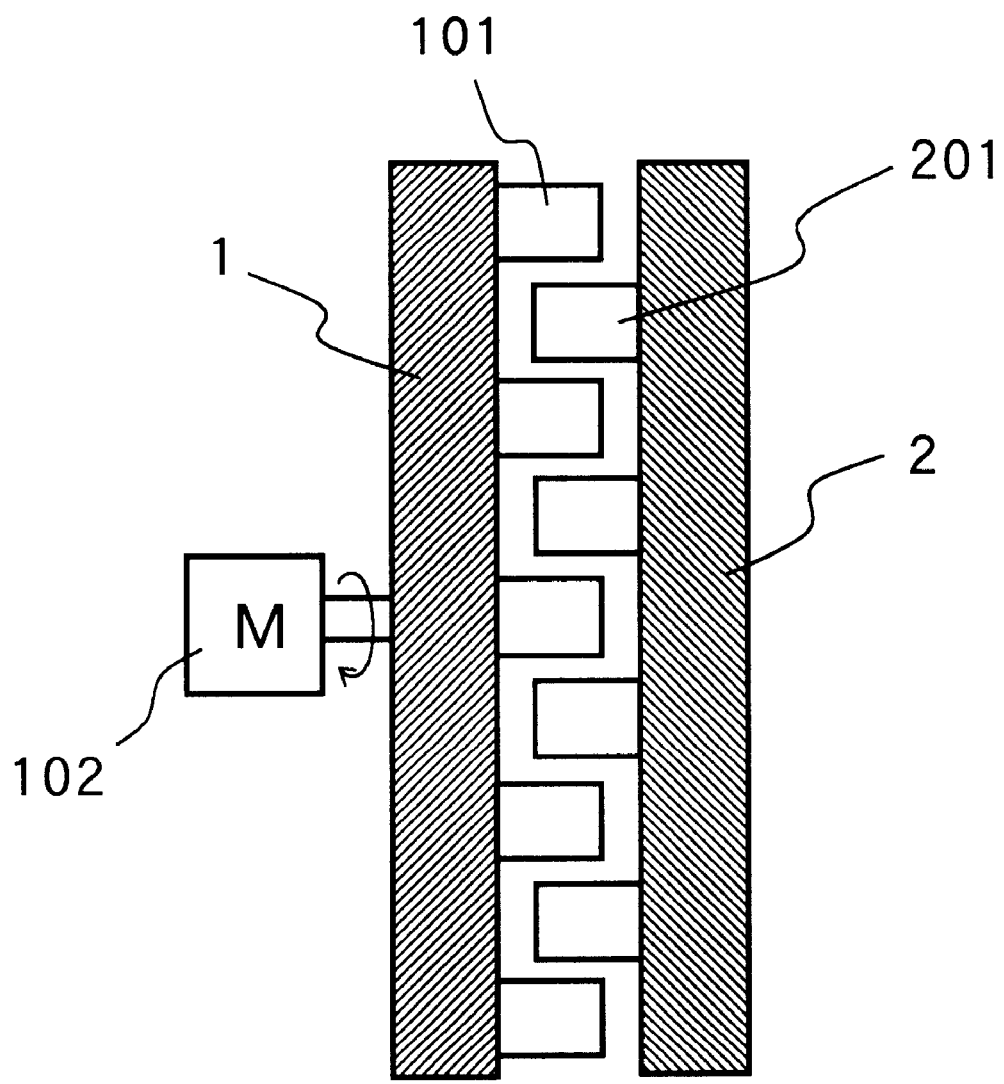
FIG. 1 is a sectional view of a main portion of a mill used in the present invention.

The process for producing an aqueous dispersion according to the present invention employs as a raw material a polymer substance which is melted in a melting vessel in advance so as to assume a liquid state.

No particular limitation is imposed on the polymer substance serving as a raw material so long as it can be melted to assume a liquid state. Preferred examples of the polymer substance include asphalts such as petroleum asphalt (e.g. straight asphalt and blown asphalt), bitumen, and tar; and thermoplastic resins such as polyethylene, polypropylene, butadiene resin, polystyrene, polyvinyl chloride, ethylene vinyl acetate, petroleum resin, paraffin wax, methacryl resin, AS resin, and ABS resin. These substances may be used singly or in combination of two or more species.

In the present invention, a pulverized solid may be mixed with a polymer substance melted to assume a liquid state so long as the solid does not adversely affect the liquid state of the substance. Preferred examples of the solid include inorganic substances such as silica, thermosetting resins such as epoxy and polyester, and thermoplastic resins of high softening point.

In the present invention, the above-described raw material is melted with heat in a melting vessel before use, and after melting the raw material is preferably stored in a heat-insulating tank. In the process according to the present invention, a polymer of high softening point may be used by the application of heat at high temperature, and asphalt melted with heat may be advantageously used after conveyance by a tank truck.

In the present invention, poval is advantageously used as an aqueous solution, and such a method is not disclosed in Japanese Patent Application Laid-Open (kokai) No. 304876/1995. Conventionally, partially-saponified poval swollen with water in the form of sponge block has been used, and six hours or more have been required for causing poval to swell into the form. However, in the present invention, poval may be used as an aqueous solution, to thereby greatly shorten preparation time for production. Furthermore, an aqueous poval solution may be conveyed by use of a pump, to thereby greatly improve handling and workability.

An aqueous solution of partially-saponified poval used in the present invention has a degree of polymerization of 300–3,000, preferably 500–2,000, and a degree of saponification of 70–98, preferably 80–90.

In consideration of workability and production of a high-concentration dispersion, the concentration of poval is preferably 10 wt. %. When poval is used at such a concentration, the dispersion may be produced in a few minutes, to thereby advantageously reduce production time.

In consideration of appropriate viscosity and water-resistance, the amount of an aqueous poval solution is preferably 0.5–10 wt. % based-on a polymer substance serving as a raw material (the amounts of both the raw material and poval are on a solid basis), more preferably 1–3%.

When an aqueous poval solution is used as an emulsifier, an emulsion may be produced, but in order to reduce particle size of the emulsion and to homogenize the emulsion, a surfactant is preferably used in combination with the aqueous poval solution.

Examples of surfactants which may be used include cationic surfactants, anionic surfactants, and nonionic surfactants.

Use of a cationic surfactant is limited, since the surfactant chemically reacts with AE water reducing agent, which is generally used in concrete, in which case an emulsion may be drastically gelled. Meanwhile, when an anionic surfactant is mixed into concrete, the concrete may contain a large amount of air, and therefore the amount and type of the anionic surfactant must be selected carefully. A nonionic surfactant is relatively safe for use, since it does not drastically react with an AE water reducing agent, and when the surfactant is mixed into concrete, the concrete does not contain a large amount of air.

The amount of a surfactant depends on the type thereof, and is preferably 0.01–5 wt. % based on a polymer substance serving as a raw material (the amounts of both the raw material and the surfactant are on a solid basis).

In the present invention, surfactants are preferably used in combination of an anionic surfactant and a nonionic surfactant, and the anionic surfactant and the nonionic surfactant are preferably used in amounts of 2% and 0.3%, respectively.

In the present invention, a mixing apparatus comprising a rotational body and a non-rotational body, or a mixing apparatus comprising two rotational bodies may be used, and preferably the former apparatus is used.

In a preferred embodiment of the present invention, a mixing apparatus is a mill, and the mill comprises a disk-type rotor serving as a rotational body and a stator serving as a non-rotational body. In the mill, the rotor and the stator are disposed oppositely, a protrusion is formed on at least one of the surfaces of the rotor and the stator, and the rotor and the stator are disposed such that the distance therebetween is narrow.

FIG. 1 shows a situation in which a rotor and a stator are opposingly disposed and engaged with each other leaving space therebetween. The rotor and the stator are preferably used in the present invention. In FIG. 1, reference numeral 1 denotes a rotor and reference numeral 2 denotes a stator.

The rotor 1 comprises teeth 101, each of which is an example of a protrusion on the surface of the rotor 1, and in the same way, the stator 2 comprises teeth 201. The teeth may be formed on either the rotor 1 or the stator 2, but, as shown in FIG. 1, the teeth are preferably formed on both the rotor 1 and the stator 2, in consideration of productivity of a dispersion. In FIG. 1, reference numeral 102 denotes a motor for rotating the rotor 1.

The teeth 101 and the teeth 201 are aligned concentrically on the surfaces of the rotor 1 and the stator 2. When the rotor 1 rotates, the teeth of the rotor do not contact the teeth of the stator 2, and very small spaces are defined between the teeth. The shape and number of the teeth are not limited to those shown in FIG. 1.

The distance between the rotor 1 and the stator 2 refers to the distance between the opposing surfaces of the rotor 1 and the stator 2, and in the portions of the teeth, refers to the distance between the head of a tooth and the opposed surface. The distance between the rotor 1 and the stator 2 is preferably 0.05–1.0 mm, more preferably about 0.3 mm. A narrow distance has the effect of destroying the dispersion, whereas a wide distance yields a dispersion of coarser particle size.

When a raw material and an aqueous poval solution are fed to the mill, the pressure applied thereto is preferably 1–10 kgf/cm$^2$, more preferably 4 kgf/cm$^2$. Lower pressure yields a dispersion of coarser particle size, whereas higher pressure has the effect of destroying the dispersion.

In the present invention, a polymer substance melted to assume a liquid state and serving as a raw material, and an aqueous poval solution are fed into the space defined in the mill, and the rotor 1 is rotated at high speed to thereby produce an aqueous dispersion in a continuous manner.

The rotation speed of the rotor 1 is preferably 500–10,000 rpm, more preferably about 6,000 rpm. The lower the rotational speed, the coarser the particle size of the dispersion. An excessively high speed has the effect of destroying the dispersion.

In the production process according to the present invention, a raw material and an aqueous poval solution are dispersed almost instantly, to thereby greatly improve productivity. In a conventional technique, completion of an aqueous dispersion requires about 60 minutes after a raw material being placed into a kneading apparatus, but the present invention considerably shortens the production time, as is described above.

The above-described embodiment is drawn to a mill comprising a disk-type rotor serving as a rotational body and a stator serving as a non-rotational body, in which the rotor 1 and the stator 2 are preferably removable. The stator 2 may be independently formed as a stationary part, and may be formed in accordance with the shape of the inside of the mill.

EXAMPLES

The present invention will next be described in more detail by way of examples, which should not be construed as limiting the invention thereto.

Example 1

By use of a pump, straight asphalt melted at 150° C. was fed to a mill at a pressure of 4 kgf/cm$^2$.

Partially-saponified poval (Gosenol GL05, product of Nihon Gosei Kagaku) having a degree of polymerization of 500 and a degree of saponification of 88% was dissolved in water so that the poval content became 10%, and the thus-obtained 10% aqueous poval solution was fed to the mill at a pressure of 4 kgf/cm$^2$ by use of a pump.

The distance between a rotor and a stator in the mill was 0.3 mm. The rotor 1 was rotated at 6,000 rpm to thereby produce an aqueous dispersion of asphalt.

The mean particle size of the asphalt in the thus-produced aqueous dispersion was 1 μm, as measured under an optical microscope. The dispersion was stable and exhibited no phase separation one month after the production.

Example 2

By use of a pump, a petroleum resin (Neopolymer #80, product of Nippon Petrochemicals Co., Ltd.) melted at 100° C. was fed to-a mill at a pressure of 4 kgf/cm$^2$.

Partially-saponified poval (Gosenol GL05, product of Nihon Gosei Kagaku) having a degree of polymerization of 500 and a degree of saponification of 88% was dissolved in water so that the poval content became 10%, and the thus-obtained 10% aqueous poval solution was fed to the mill at a pressure of 4 kgf/cm$^2$ by use of a pump.

The distance between a rotor and a stator in the mill was 0.3 mm. The rotor 1 was rotated at 6,000 rpm to thereby produce an aqueous dispersion of the petroleum resin.

The mean particle size of the petroleum resin of the thus-produced aqueous dispersion was 1 μm, as measured under an optical microscope. The dispersion had excellent stability in storage.

Example 3

By use of a pump, straight asphalt melted at 150° C., a petroleum resin (Neopolymer #80, product of Nippon Petrochemicals Co., Ltd.) melted at 100° C., and 10% aqueous solution of Gosenol GL05 were independently fed to a mill at a pressure of 4 kgf/cm².

The distance between a rotor and a stator in the mill was 0.3 mm. The rotor 1 was rotated at 6,000 rpm to thereby produce a two-component aqueous dispersion system of asphalt and petroleum resin.

The mean particle size of the asphalt and the petroleum resin of the thus-produced aqueous dispersion was 0.5 μm, as measured under an optical microscope, and the dispersion had excellent stability in storage.

Example 4

The procedures of Examples 1 and 2 were repeated, except that the surfactants shown in Table 1 were added to the polymer substance serving as a raw material, to thereby obtain test data. The results are shown in Table 1. In the table, the term "particle size" refers to mean particle size.

In the example, Cation F2 (product of Nippon Oil and Fats Co., Ltd.), Renovel W (product of Kao Corporation), and Nonion NS (product of Nippon Oil and Fats Co., Ltd.) were used as a cationic surfactant, an anionic surfactant, and a nonionic surfactant, respectively.

Example 5

The aqueous dispersion obtained from Example 1 or the aqueous dispersion obtained from Example 3 of Japanese Patent Application Laid-Open (kokai) No. 304876/1995 (Blagic C, product of Tokiwa Chemical) was used as a waterproof agent, to thereby produce concrete. The thus-produced concrete was subjected to measurement of slump value, air content, and compressive strength in accordance with the following methods. The results are shown in Table 2.

(Method of Measurement)

Slump value was measured by use of a method according to JIS A1101.

Air content was measured by use of a method according to JIS A1128.

Compressive strength was measured by use of a method according to JIS A1108.

In addition, the above-produced concrete was subjected to the following water absorption test, to thereby obtain percent water absorption. The results are shown in Table 3.

Water absorption test: A prism body of concrete having a size of 10 cm×10 cm×40 cm was produced and subjected to water curing at 20° C. for seven days. After completion of water curing, the prism body was removed from the water, dried at 80° C. for 48 hours, and cooled gradually to 20° C., after which the prism body was weighed and soaked in water. Subsequently, the prism body was removed from the water, water on the surface thereof was immediately wiped off, and the prism body was weighed and soaked in water again. The procedure was repeated 0.5, 1, 2, 4, 8, 24, and 48 hours after the first soaking. The weight of the prism body before soaking was subtracted from the weight after each soaking, and the result was divided by the weight before soaking and multiplied by 100, to thereby obtain percent water absorption.

TABLE 1

| | Type and amount of surfactant | | | |
|---|---|---|---|---|
| Test No. | Cationic surfactant (%) | Anionic surfactant (%) | Nonionic surfactant (%) | Particle size (μm) |
| Test 1 | 0.5 | 0 | 0 | 0.5 |
| Test 2 | 0 | 2 | 0 | 0.5 |
| Test 3 | 0 | 0 | 0.3 | 0.5 |
| Test 4 | 0 | 2 | 0.3 | 0.5 |
| Test 5 | 0.5 | 0 | 0 | 0.5 |
| Test 6 | 0 | 2 | 0 | 0.5 |
| Test 7 | 0 | 0 | 0.3 | 0.5 |
| Test 8 | 0 | 2 | 0.3 | 0.5 |

Tests 1 to 4: The procedure of Example 1 was repeated, except that the surfactants shown in Table 1 were added.

Tests 5 to 8: The procedure of Example 2 was repeated, except that the surfactants shown in Table 1 were added.

TABLE 2

| Type of concrete | Waterproof agent | Cement (kg/m³) | Water (kg/m³) | Fine aggregate (kg/m³) | Coarse aggregate (kg/m³) | AE water reducing agent (g/m³) | Slump (cm) | Air content (%) | compressive strength (N/mm²) | |
|---|---|---|---|---|---|---|---|---|---|---|
| | | | | | | | | | 7 days after production | 28 days after production |
| A | Not added | 300 | 188 | 775 | 970 | 500 | 19 | 4.5 | 17.7 | 25.7 |
| B | BC 6 | 300 | 184 | 775 | 970 | 250 | 19 | 4.8 | 17.2 | 26.8 |
| C | BC 10 | 300 | 181 | 775 | 970 | 200 | 19.5 | 5.5 | 18.8 | 25.7 |
| D | Product of the present invention 4 | 300 | 186 | 775 | 970 | 400 | 19 | 5.0 | 23.8 | 30.4 |
| E | Product of the present invention 6 | 300 | 183 | 775 | 970 | 250 | 18.5 | 4.5 | 21.1 | 28.1 |
| F | Product of the present invention 10 | 300 | 179 | 775 | 970 | 200 | 18.5 | 4.2 | 21.9 | 30.5 |

BC: Blagic - C
AE water reducing agent: Use of Posolis No. 70 and No. 303A

TABLE 3

| Type of concrete | Soaking time in water (hours) | | | | | | |
|---|---|---|---|---|---|---|---|
| | 0.5 | 1 | 2 | 4 | 8 | 24 | 48 |
| A | 2.46 | 2.88 | 3.30 | 3.61 | 3.95 | 4.31 | 4.34 |
| B | 1.86 | 2.25 | 2.58 | 2.89 | 3.13 | 3.54 | 3.72 |
| C | 1.61 | 1.97 | 2.29 | 2.56 | 2.78 | 3.15 | 3.31 |
| D | 1.98 | 2.11 | 2.33 | 2.54 | 2.76 | 3.09 | 3.28 |
| E | 1.62 | 1.87 | 2.17 | 2.34 | 2.56 | 2.86 | 2.98 |
| F | 1.40 | 1.63 | 1.98 | 2.00 | 2.16 | 2.44 | 2.54 |

What is claimed is:

1. A process for producing an aqueous dispersion of a polymer substance, which comprises:

feeding a liquid polymer substance serving as a raw material and an aqueous poval solution to a predetermined space in a mixing apparatus, the space being defined by two relatively rotatable bodies of the mixing apparatus; and relatively rotating the bodies at high speed, to thereby produce an aqueous dispersion of the polymer substance in a continuous manner.

2. A process for producing an aqueous dispersion of a polymer substance according to claim 1, wherein a pressure applied to the raw material and the aqueous poval solution, which are fed to the mixing apparatus, is 1–10 kgf/cm$^2$.

3. A process for producing an aqueous dispersion of a polymer substance according to claim 1, wherein the relative rotation is 500–10,000 rpm.

4. A process for producing an aqueous dispersion of a polymer substance according to claim 1, wherein the polymer substance is selected from among asphalts which can be melted with heat and/or thermoplastic resins.

5. A process for producing an aqueous dispersion of a polymer substance according to claim 1, wherein the aqueous poval solution contains partially saponified poval having a degree of polymerization of 300–3,000 and a degree of saponification of 70–98.

6. A process for producing an aqueous dispersion of a polymer substance according to claim 1, wherein the amount of the aqueous poval solution is 0.5–10 wt. % based on the polymer substance serving as a raw material, with the amounts of both the raw material and poval being on a solid basis.

7. A process for producing an aqueous dispersion of a polymer substance according to claim 1, further comprising the step of adding a surfactant to the aqueous poval solution, wherein the amount of the surfactant is 0.01–5 wt. % based on the polymer substance serving as a raw material, with the amounts of both the raw material and the surfactant being on a solid basis.

8. A process for producing an aqueous dispersion of a polymer substance, which comprises:

feeding a liquid polymer substance serving as a raw material and an aqueous poval solution to a predetermined space in a mixing apparatus, the space being defined by a rotational body and a non-rotational body of the mixing apparatus; and relatively rotating the rotational body at high speed, to thereby produce an aqueous dispersion of the polymer substance in a continuous manner.

9. A process for producing an aqueous dispersion of a polymer substance according to claim 8, wherein a pressure applied to the raw material and the aqueous poval solution, which are fed to the mixing apparatus, is 1–10 kgf/cm$^2$.

10. A process for producing an aqueous dispersion of a polymer substance according to claim 8, wherein the rotational body rotates at 500–10,000 rpm.

11. A process for producing an aqueous dispersion of a polymer substance according to claim 8, wherein the polymer substance is selected from among asphalts which can be melted with heat and/or thermoplastic resins.

12. A process for producing an aqueous dispersion of a polymer substance according to claim 8, wherein the aqueous poval solution contains partially saponified poval having a degree of polymerization of 300–3,000 and a degree of saponification of 70–98.

13. A process for producing an aqueous dispersion of a polymer substance according to claim 8, wherein the amount of the aqueous poval solution is 0.5–10 wt. % based on the polymer substance serving as a raw material, with the amounts both the raw material and poval being on a solid basis.

14. A process for producing an aqueous dispersion of a polymer substance according to claim 8, further comprising the step of adding a surfactant to the aqueous poval solution, wherein the amount of the surfactant is 0.01–5 wt. % based on the polymer substance serving as a raw material, with the amounts of both the raw material and the surfactant being on a solid basis.

15. A process for producing an aqueous dispersion of a polymer substance according to claim 8, wherein the mixing apparatus is a mill, the mill comprises a disk-type rotor serving as a rotational body and a stator serving as a non-rotational body, the rotor and the stator are disposed oppositely such that a narrow space is formed between the rotor and the stator, a protrusion is formed on at least one of the opposed surfaces of the rotor and the stator, the polymer substance serving as a raw material which is melted in advance so as to assume a liquid state and the aqueous poval solution are fed to the narrow space in the mill, and the rotor is rotated at high speed, to thereby produce an aqueous dispersion in a continuous manner.

16. A process for producing an aqueous dispersion of a polymer substance according to claim 15, wherein the distance between the rotor and the stator is 0.05–1.0 mm.

17. A process for producing an aqueous dispersion of a polymer substance according to claim 15, wherein a pressure applied to the raw material and the aqueous poval solution, which are fed to the mixing apparatus, is 1–10 kgf/cm$^2$.

18. A process for producing an aqueous dispersion of a polymer substance according to claim 15, wherein the rotational body rotates at 500–10,000 rpm.

19. A process for producing an aqueous dispersion of a polymer substance according to claim 15, wherein the polymer substance is selected from among asphalts which can be melted with heat and/or thermoplastic resins.

20. A process for producing an aqueous dispersion of a polymer substance according to claim 15, wherein the aqueous poval solution contains partially saponified poval having a degree of polymerization of 300–3,000 and a degree of saponification of 70–98.

21. A process for producing an aqueous dispersion of a polymer substance according to claim 15, wherein the amount of the aqueous poval solution is 0.5–10 wt. % based on the polymer substance serving as a raw material, with the amounts of both the raw material and poval being on a solid basis.

22. A process for producing an aqueous dispersion of a polymer substance according to claim 15, further comprising the step of adding a surfactant to said aqueous poval solution, wherein the amount of the surfactant is 0.01–5 wt. % based on the polymer substance serving as a raw material, with the amounts of both the raw material and the surfactant being on a solid basis.

* * * * *